United States Patent [19]
Kasson

[11] Patent Number: 5,473,740
[45] Date of Patent: Dec. 5, 1995

[54] METHOD AND APPARATUS FOR INTERACTIVELY INDICATING IMAGE BOUNDARIES IN DIGITAL IMAGE CROPPING

[75] Inventor: James M. Kasson, Menlo Park, Calif.

[73] Assignee: International Business Machines Corporation, Armonk, N.Y.

[21] Appl. No.: 175,007

[22] Filed: Dec. 29, 1993

[51] Int. Cl.$^6$ .................................................. G06T 15/30
[52] U.S. Cl. .......................... 395/134; 395/133; 395/155; 395/161; 358/453
[58] Field of Search .................................... 395/133–136, 395/142, 143, 155–161; 355/45, 74; 358/80, 102, 296, 342, 406, 453; 345/115; 365/145

[56] References Cited

U.S. PATENT DOCUMENTS

| | | | |
|---|---|---|---|
| 4,202,624 | 5/1980 | Krehbiel | 355/45 |
| 4,603,956 | 8/1986 | Brownstein | 355/45 |
| 4,603,966 | 8/1986 | Brownstein | 355/45 |
| 4,660,101 | 4/1987 | Martin | 358/342 |
| 4,694,354 | 9/1987 | Tanaka et al. | 358/296 |
| 4,774,569 | 9/1988 | Morton | 358/102 |
| 4,831,556 | 5/1989 | Oono | 395/157 |
| 4,910,611 | 3/1990 | Cok | 358/453 |
| 4,992,781 | 2/1991 | Iwasaki et al. | 345/115 |
| 5,045,878 | 9/1991 | Taeger | 355/74 |
| 5,115,271 | 5/1992 | Hagopian | 355/74 |
| 5,125,073 | 6/1992 | Lien et al. | 395/142 |
| 5,138,443 | 8/1992 | Ikeda et al. | 358/80 |
| 5,140,548 | 8/1992 | Brennan | 365/145 |
| 5,153,745 | 10/1992 | Brandkamp et al. | 358/406 |
| 5,185,858 | 2/1993 | Emery et al. | 395/158 |
| 5,241,656 | 8/1993 | Loucks et al. | 395/158 |
| 5,263,134 | 11/1993 | Paal et al. | 395/157 |

FOREIGN PATENT DOCUMENTS

| | | | |
|---|---|---|---|
| WO89/00741 | 1/1989 | WIPO | G06K 3/00 |

OTHER PUBLICATIONS

Adobe Photoshop Operation Manual, pp. 189–191, date unknown.

*Primary Examiner*—Almis R. Jankus
*Attorney, Agent, or Firm*—Baker, Maxham, Jester & Meador

[57] ABSTRACT

The user moves a mouse to position a cursor on the original image and depresses the mouse pushbutton to designate a first corner (x1, y1) of the initially desired rectangular cropped image. The mouse is then manually moved and the sequentially updated position of the cursor instantaneously defines a second corner (x2, y2) diagonally opposite the first corner. All the time the mouse is moved and its pushbutton still depressed a sequentially varying area potential cropped image and a correspondingly sized obscured portion are displayed. If the user is satisfied with the aesthetics of the current cropped image he or she releases the mouse pushbutton, moves the cursor within the boundaries of the current cropped image and double clicks in order to select this cropped image for further processing, such as inclusion into a document being concurrently displayed in another window. Alternatively, any two of x1, y1, x2 and y2 can be updated by positioning the cursor over one of the four corners of the rectangular boundary of the current cropped image, depressing the mouse pushbutton, and holding it down while the cursor is moved.

21 Claims, 5 Drawing Sheets

METHOD AND APPARATUS FOR INTERACTIVELY INDICATING IMAGE BOUNDARIES IN DIGITAL IMAGE CROPPING

BACKGROUND OF THE INVENTION

1. Field of the Invention

The present invention relates to the manipulation of computer generated images on a display, and more particularly, to a method and apparatus for interactive cropping that eliminates the distractions associated with the conventional image cropping technique.

2. Discussion of the Related Art

In the processing of photographic or photorealistic images, users often wish to exclude portions of the image. This operation is called cropping. Conventional methods for cropping allow some or all of the excluded portion of the image to remain visible during the selection of the area to be included. The excluded portion of the image distracts the user and makes it more difficult to visualize the cropped image.

In digital image processing, the user selects a portion of an image and discards the rest by controlling the position and size of a rectangle with a manual pointing device such as a mouse. The conventional cropping technique executed by software image editors requires the user to indicate the boundaries of the new image by a thin border applied over the original image. In this presentation, the part of the original image that is outside the area of the new image serves as a distraction to the user, sometimes preventing proper visualization of the aesthetics of the new image. When the software program is commanded to complete the cropping, the new image is finally visible without the distractions, but it is time consuming for the user to go back and re-crop. In addition, because the user cannot easily compare the effects of similar but non-identical cropping boundaries, the best cropping for the application can easily be overlooked.

U.S. Pat. No. 4,603,966 of Brownstein discloses a system for cropping photographs. A solid state sensor is used to create an electronic image of the photograph which is displayed on a video monitor. A zoom lens allows for magnification, an X-Y translation stage moves the film vertically and horizontally, and a rotatable table allows for selective rotation of the film about a centerline. A horizontal or vertical rectangular reticile is displayed on the video monitor and the portion of the image within the reticile can be printed as shown. The portion outside the reticile can be "blanked out" by depressing the print button. The system of the Brownstein patent is similar to the conventional cropping technique executed by software image editors in that only the final cropped image is displayed when the excluded portion is "blanked out". While the is distraction of the excluded portion of the image is removed, the user must restore the entire original image to evaluate whether re-cropping would improve the final product.

SUMMARY OF THE INVENTION

It is therefore the primary object of the present invention to provide an improved method and apparatus for interactively indicating image boundaries in digital image cropping.

According to the illustrated embodiment of my method, a user moves a mouse to position a cursor on the original image and depresses the mouse pushbutton to designate a first corner (x1, y1) of the initially desired rectangular cropped image. The mouse is then manually moved and the sequentially updated position of the cursor instantaneously defines a second corner (x2, y2) diagonally opposite the first corner. All the time the mouse is moved and its pushbutton still depressed a sequentially varying area potential cropped image and a correspondingly sized obscured portion are displayed. If the user is satisfied with the aesthetics of the current cropped image he or she releases the mouse pushbutton, moves the cursor within the boundaries of the current cropped image and double clicks in order to select this cropped image for further processing, such as inclusion into a document being concurrently displayed in another window. Alternatively, any two of x1, y1, x2 and y2 can be updated by positioning the cursor over one of the four corners of the rectangular boundary of the current cropped image, depressing the mouse pushbutton, and holding it down while the cursor is moved.

The illustrated embodiment of my apparatus comprises a personal computer equipped with a display adapter. The display adapter includes a conventional digital-to-analog converter circuit for driving the raster display of the personal computer. It further includes first and second image buffers for storing digitized versions of the original image and the non-distracting background, respectively. The buffers are selectively switched to the digital-to-analog converter circuit under control of a buffer selector circuit. An address calculation circuit is connected to the buffer selector circuit for indicating the current pixel location of the raster beam during its sweep. If the pixel location is inside the current cropped imaged boundaries defined by x1, y1, x2 and y2, the value of that pixel is taken from the first image buffer. If the pixel location is outside the current cropped imaged boundaries defined by x1, y1, x2 and y2, the value of that pixel is taken from the second image buffer.

DETAILED DESCRIPTION OF THE PREFERRED EMBODIMENTS

Figure 1:
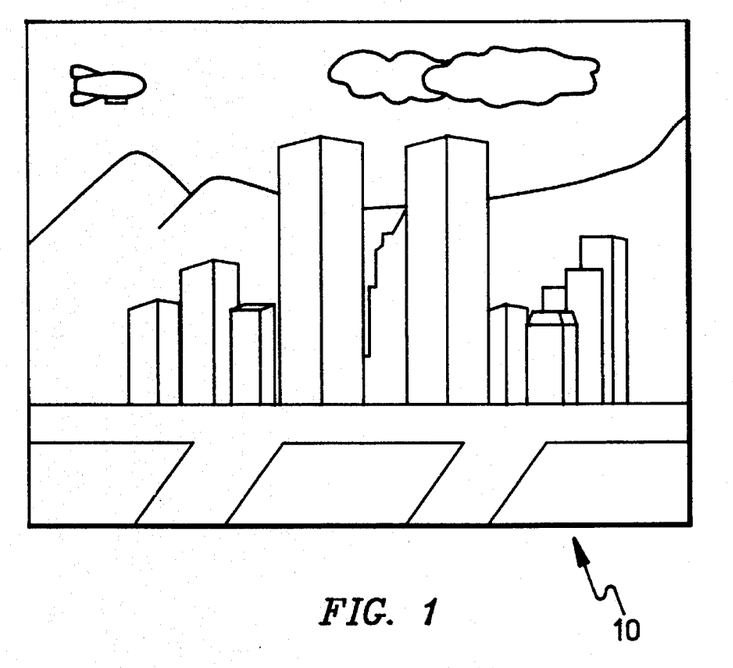
FIG. 1 illustrates a computer generated image which is to be cropped.

FIG. 1 illustrates a computer generated image 10 of a city skyline with streets in the foreground and mountains in the background. A blimp and clouds are illustrated in the sky.

Figure 2:
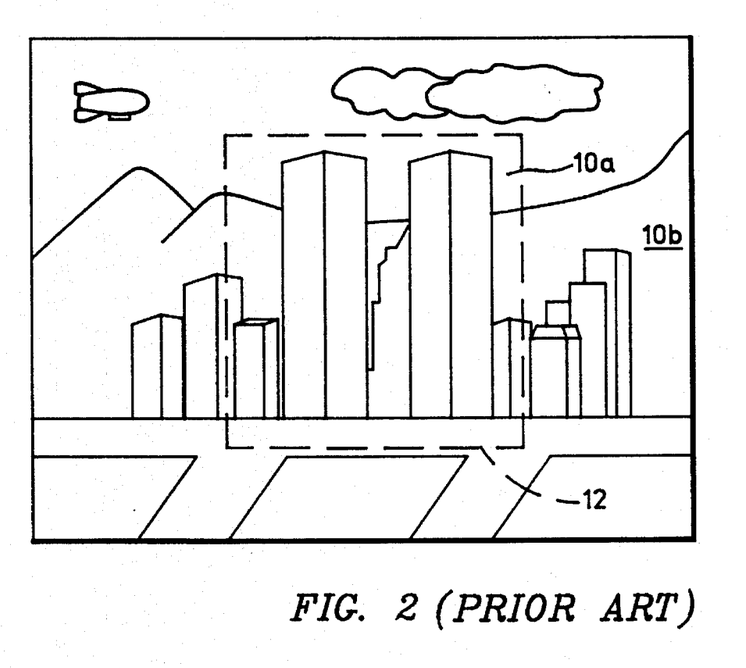
FIG. 2 illustrates the computer generated image of FIG. 1 with a phantom line rectangle defining image boundaries in conventional digital image cropping.

This is the image that the user first sees on the display before cropping. Typically the image 10 is shown in a window on a video monitor of a personal computer along with menus, text and/or other windows. FIG. 2 illustrates the same computer generated image 10 which has been divided into an included portion 10a and an excluded portion 10b defined by the conventional method for indicating a set of boundaries of the cropped image delineated by the phantom line rectangle 12. The excluded portion 10b of the image distracts the user and makes it more difficult for him or her to visualize the final cropped image which is the included portion 10a illustrated in FIG. 2.

Conventional image editing software typically displays the set of boundaries 12 as a solid line rectangle of predetermined dimensions and orientation. The rectangle can be moved about the original image 10 by manipulating the direction keys of a conventional keyboard or by moving a mouse. Upon striking the enter key of the keyboard or double clicking the mouse pushbutton when the cursor is in the interior of the cropped portion 10a of the image, the cropped portion 10a is displayed alone, without the excluded portion 10b of the image. If the user is not satisfied with the appearance of the cropped image, he or she must restore the entire original image 10, which again involves more mouse clicks or keystrokes, and then re-position the boundaries 12 to select a new portion of the image to be cropped.

Figure 3A:
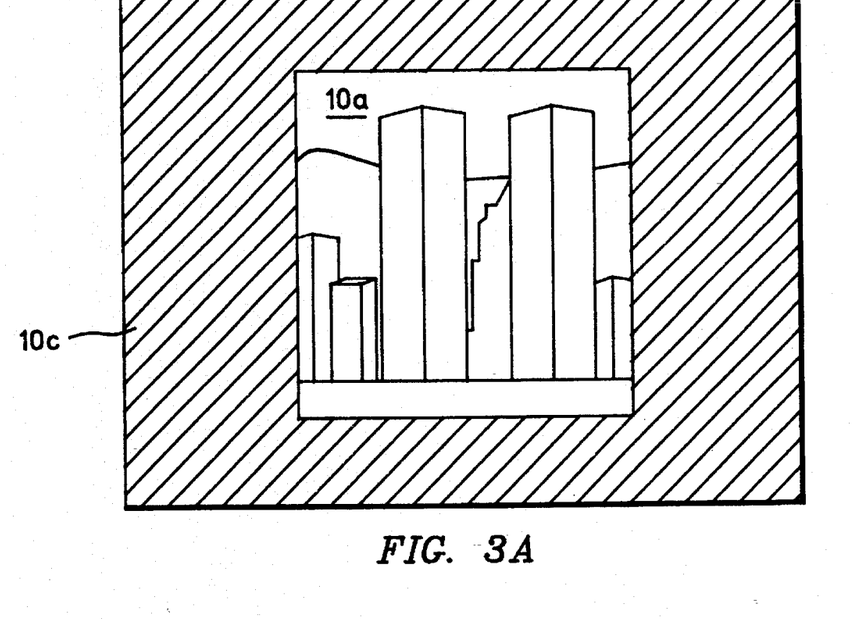
FIG. 3A illustrates the included portion of the cropped image while the excluded portion of the image is obscured as indicated by the cross-hatching in accordance with my invention
Figure 3B:
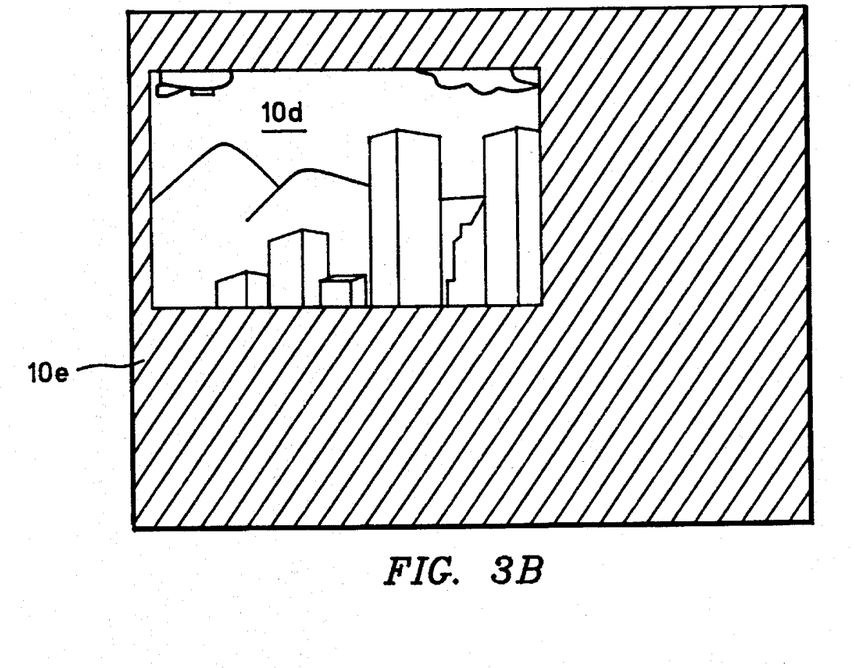
FIG. 3B illustrates the included portion of a different smaller cropped image resulting from mouse manipulation in accordance with my invention. The larger excluded obscured portion is again indicated by cross-hatching.

FIGS. 3A and 3B illustrate the method of my invention for interactively indicating image boundaries in digital image cropping. The user first moves the mouse 26 to position an arrow cursor (not shown) and depresses the mouse pushbutton to designate a first corner (x1, y1) of the initially desired cropped image. The mouse is then manually moved by the user to re-position the cursor. Its sequentially updated position on the display defines a second corner (x2, y2) diagonally opposite the first corner, eventually causing the cropped image 10a and the obscured portion 10c to be displayed. The obscured portion may be displayed as a neutral, non-distracting uniform background color, such as eighteen percent gray. All the time that the mouse 26 is moved and its pushbutton still depressed a sequentially varying area potential cropped image and a correspondingly sized obscured portion are displayed. The otherwise distracting excluded portion of the image is not visible and the user can decide whether or not the currently cropped image has the proper aesthetics.

If the user is satisfied with the cropped image 10a illustrated in FIG. 3A, he or she releases the mouse pushbutton, moves the mouse to position the cursor within the boundaries of the cropped image 10a, and depresses the mouse pushbutton twice in succession ("double clicks"). The current cropped image is thus selected for further processing, such as inclusion into a document being concurrently displayed in another window. If the user is dissatisfied with the current cropped image 10a, then the double clicking step is avoided and instead any corner of the cropped image 10a can be moved to show a different cropped image such as 10d (FIG. 3B) with a different obscured portion 10e.

Once the initial cropping has been performed, the user is able to move any corner of the cropping boundaries, not just the two corners that were used to define the cropping boundaries in the first place. For example, if the user initially defined the cropping boundaries from the upper left to the bottom right, x1 and y1 refer to the location of the upper left corner, and x2 and y2 refer to the location of the lower right corner. If the user then chooses to move the upper right corner, he or she would then be affecting y1 and x2. Thus a new cropped image can be designated by updating any two values of the group consisting of x1, y1, x2 and y2.

It will be noted that the re-cropped image 10d is in a different location of the original image 10 (FIG. 1 ), and has a different height and width than the original cropped image 10a (FIG. 3A). Furthermore, the new obscured portion 10e (FIG. 3B) is larger and covers a different area than the original obscured portion 10c (FIG. 3A). If the user desires to select the newly cropped image 10d (FIG. 3B) he or she moves the mouse to position the cursor within the boundaries of the newly cropped image 10d and double clicks the pushbutton of the mouse.

Thus, my method provides a way to interactively compare subtly different image croppings with the minimum number of commands while minimizing, or even eliminating the distraction otherwise present if the excluded portion of the image were still displayed in the conventional fashion illustrated in FIG. 2.

It will be apparent to those skilled in the art that my invention can be modified in both arrangement and detail. For example, it is possible to use non-rectangular boundaries for the original image, for the cropped image, or for both. When the original image is displayed in color, the excluded portion of the image can be displayed in black and white. The excluded portion of the image can be replaced with patterns, rather than solid colors. These patterns can include cross-hatching, dots, small circles, and so forth. The obscured portion 10c of the image can also be shown in various shades of a single color, for example, yellow.

It is possible to vary the color or pattern to automatically obscure a portion of the original image depending upon the colors in the image to be cropped. For example, if the original image had no shades of green, the obscured portion of the image could be displayed in tones of green. It is further possible to automatically vary the color or pattern in order to obscure the original image depending upon the colors on the rest of the display screen at the time the cropping operation is being carried out. For example, the excluded portion could be a shade of blue (without any image) that harmonizes with the shades of blue on the remainder of the entire screen.

A simulated frame or border can be displayed around the included portion of the original image which is to be retained. It is further possible to simulate one or more mat boards around the original image, with or without simulating the effects of lighting (shadows and highlights) on the simulated ensemble. It is further possible to simulate the appearance of the material on which the final version of the cropped image will be displayed, e.g. paper, wood, metal, plaster, stucco, etc. For example, if the final cropped image will be printed and hung on a brick wall, it would be advantageous to display a simulated brick wall pattern as the excluded portion of the video image.

Figure 4:
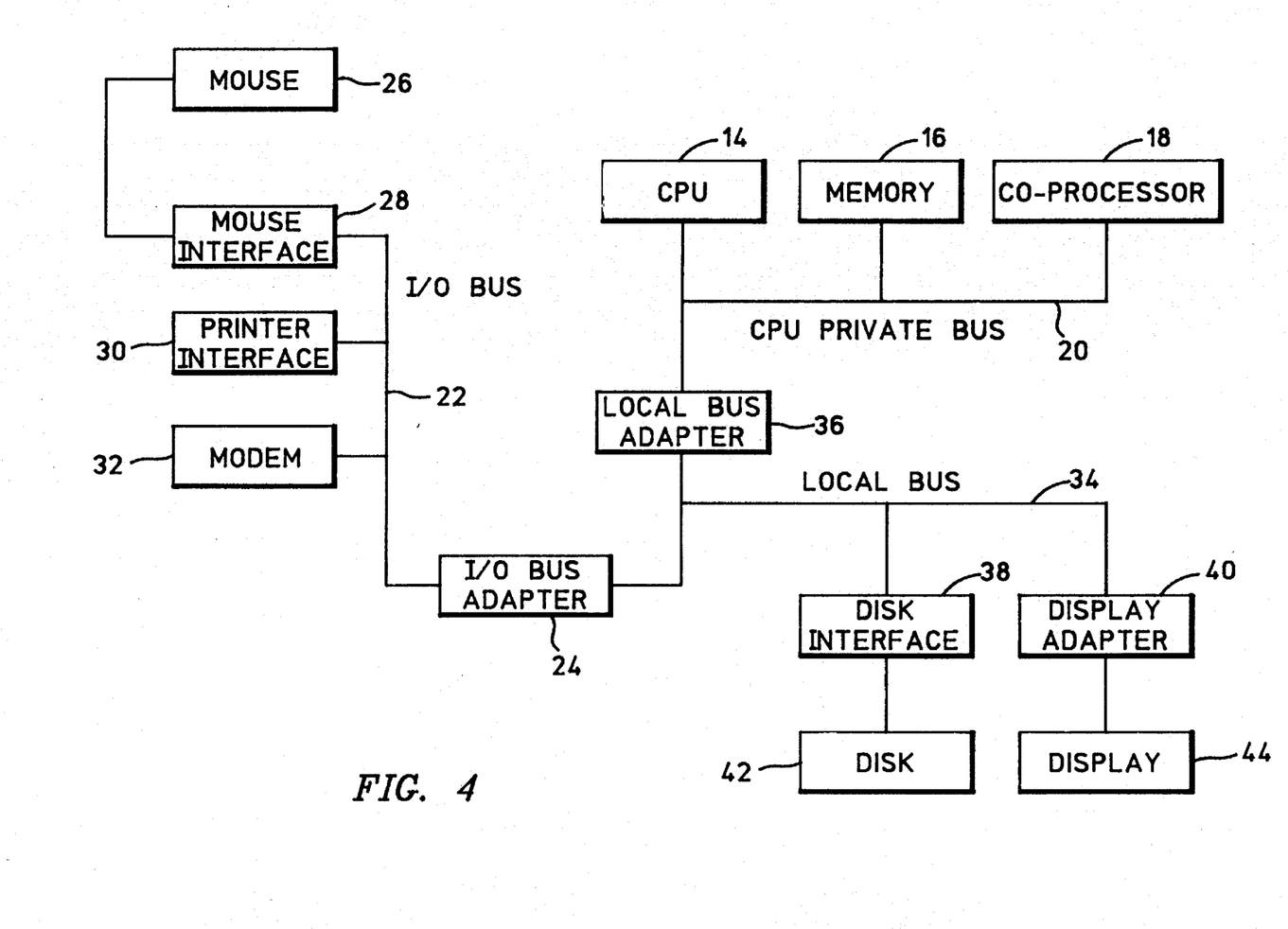
FIG. 4 is an overall block diagram of a digital image processing apparatus in accordance with the my invention.

FIG. 4 is an overall block diagram of a digital image processing apparatus in accordance with the present invention. The apparatus may be constructed utilizing a conventional personal computer with standard peripherals except for the display adapter described hereafter in detail. The personal computer could be a VALUE POINT (Trademark) personal computer commercially available from International Business Machines Corporation which is based upon the Industry Standard Architecture (ISA) or the Extended Industry Standard Architecture (EISA). It could also be a PS/2 (Trademark) personal computer commercially available from International Business Machines Corporation which is based on the MICROCHANNEL (Trademark) architecture.

The apparatus of FIG. 4 includes a CPU 14 connected to a suitably sized RAM memory 16 and a standard graphics co-processor 18 via a private bus 20. The personal computer further includes an I/O bus 22 which is connected to an I/O bus adapter 24 which converts digital data from the bus 22 into either PCI or VESA format. A mouse 26 is connected through a mouse interface circuit 28 to the I/O bus 22. A printer interface circuit 30 and a modem 32 are also connected to the I/O bus 22 and are connected to a primer (not shown) and telephone line (not shown), respectively.

The apparatus of FIG. 4 further includes a local bus 34 which is connected through a local bus adapter 36 to the CPU 14. The local bus adapter 36 provides the PCI or VESA interface with a conventional disk interface circuit 38 and a specialized display adapter 40 constructed in accordance with the present invention. The disk interface circuit 38 may comprise an industry standard small computer system interface (SCSI) circuit which connects to a conventional Winchester disk storage device 42. The display adapter 40 is connected to a conventional display 44 which is at least a VGA color CRT monitor.

Figure 5:
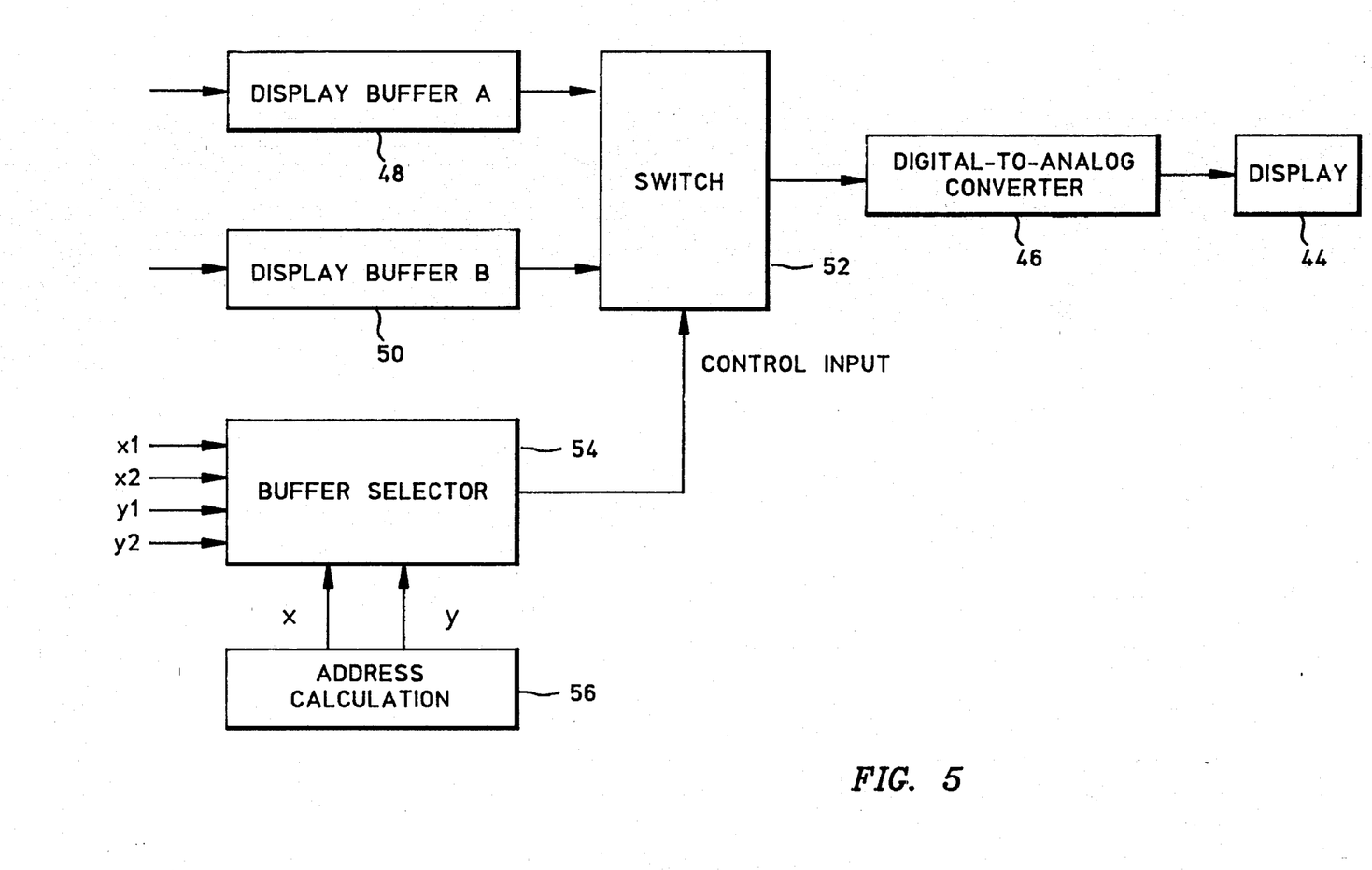
FIG. 5 is a block diagram of a portion of the display adapter of the digital image processing apparatus of FIG. 4. It is shown connected to the display also shown in FIG. 4.

FIG. 5 is a block diagram of a portion of the display adapter 40 of the digital image processing apparatus of FIG. 4. The display adapter 40 includes a conventional digital-to-analog converter (DAC) circuit 46 for driving the raster-type display 44. In addition, the display adapter 40 includes a pair of display buffers A and B labeled 48 and 50, respectively, which are connected through a switch 52 to the digital-to-analog converter circuit 46. By way of example, the image on the display 44 may be refreshed seventy times per second. Display buffer A and display buffer B store the digitized version of an image to be selectively shown on display 44 under the control of switch 52. The switch 52 is controlled through a buffer selector circuit 54 and an address calculation circuit 56.

Figure 6:
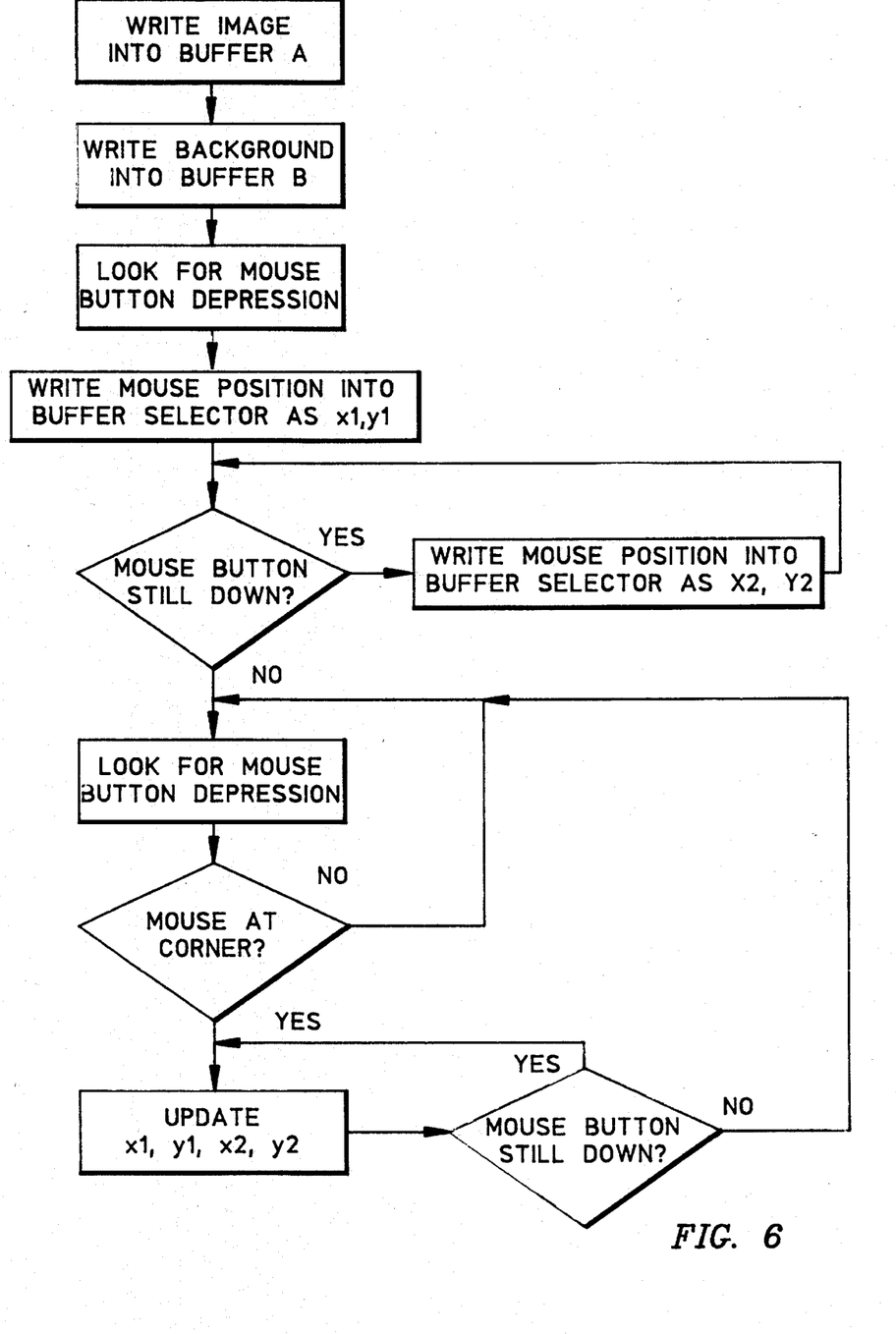
FIG. 6 is a flow diagram illustrating a method for indicating image boundaries in accordance with my invention.

The operation of the portion of the display adapter circuit illustrated in FIG. 5 can now be described in conjunction with a description of the flow diagram of FIG. 6. The entire original image 10 in digitized form is first written into display buffer A. The background, such as eighteen percent grey in digitized form is then written into display buffer B. The address calculation circuit 56 continuously provides to the buffer selector circuit 54 the x and y location of the pixel currently being illuminated by the electron beam of the VGA color monitor on the screen thereof at any given instant. The personal computer initially displays the entire original image from display buffer A and generates a mouse cursor on the display screen in the conventional fashion. The personal computer monitors the location of the cursor. When the cursor is located anywhere on the original image 10 displayed in a window on the display screen, it looks for depression of the mouse pushbutton. When the mouse pushbutton is depressed, the pixel location is written into the buffer selector 54 as x1, y1. This establishes the first corner of the image 10 to be cropped.

The personal computer continues to monitor the status of the pushbutton of the mouse. As the user moves the mouse, so long as its pushbutton remains depressed, the personal computer writes the mouse position into the buffer selector circuit 54 as the second diagonally opposite corner, x2, y2. As the mouse is moved a series of varying potential cropped images and correspondingly sized obscured images will be displayed for user evaluation. At any given time, the values of x1, y1 and x2, y2 in the buffer selector 54 are set. As the raster beam sweeps across the display screen of the display 44 the buffer selector outputs 54 either a high or a low binary signal to control the switch 52. If the pixel location or address is inside the boundaries of the rectangle defined by x1, y1 and x2, y2 the value for that pixel is taken from display buffer A. If the pixel location or address is outside the boundaries of the rectangle defined by x1, y1 and x2, y2 then the pixel value is taken from display buffer B. In this manner the current cropped image is displayed with the surrounding current obscured portion.

If the user desires to select a particular cropped image such as 10a (FIG. 3A), then he or she merely releases the mouse pushbutton, moves the mouse to position the cursor within the boundaries of the cropped image 10a, and depresses the pushbutton of the mouse twice. So long as the cursor is not at one of the four corners of the original image 10, then the cropped image 10a will be selected for further processing.

If the user is dissatisfied with the cropped image 10a, then he or she moves the mouse to position the cursor over one of the four corners of the original image 10 and any two values of x1, y1, x2 and y2 are updated to those, for example, of the newly cropped image 10d (FIG. 3B). The cursor can then be placed on top of the re-cropped image 10d, i.e. with its boundaries and the mouse button depressed twice to select the re-cropped image 10d for further processing. If the user is not satisfied with the re-cropped image 10d, the process can be repeated.

It is possible to eliminate some of the special purpose hardware in the display adapter 40. It is necessary to have a display buffer, timing and logic circuitry to scan the buffer and read out information to the DAC 46 that drives the display 46. However, other functions can be implemented in software. The processing overhead associated with obscuring the portion of the original image that will not be part of the current cropped image as the user moves the mouse can, on some low-performance microprocessors, be significant. In order to overcome the processing delays that would ensue it is possible to use a non-obscuring rectangular boundary as long as the mouse is still in motion. The portion of the original image outside the rectangular boundary could be replaced with an obscuring background only after the mouse has been stopped for at least some predetermined length of time, for example, one-half of a second. Thus, the excluded portion of the original image outside the original boundaries is obscured only if a predetermined amount of time has elapsed after a most recent designation of one of the sequentially designated variable set of boundaries.

While I have described a preferred embodiment of my method, and numerous variants thereof, along with a preferred embodiment of my apparatus for interactively indicating image boundaries in digital image cropping, further modifications and alternations will occur to those skilled in the art. For example, any potential cropped image could be rotated and scaled up or down, before selecting the cropped image for further processing. Accordingly, the protection afforded my invention should only be limited in accordance with the scope of the following claims.

I claim:

1. A method for cropping a computer generated original image on a display, comprising the steps of:

continuously adjusting a user-selected movable boundary on the original image to define a cropped image within the boundary and an excluded portion outside the boundary while continuously obscuring the excluded portion with a predetermined background.

2. A method according to claim 1 wherein the movable boundary comprises an adjustable rectangle designated by selecting a set of diagonal corners x1, y1 and x2, y2.

3. A method according to claim 2 wherein the movable boundary is designated by updating any two values of the group consisting of x1, y1, x2 and y2.

4. A method according to claim 1 wherein the original image is in color and the background is selected from the group consisting of: a uniform color, a black and white version of the excluded portion of the original image, and a predetermined pattern.

5. A method according to claim 1 wherein the original image is in color and the background is selected depending upon the colors of the original image.

6. A method according to claim 1 wherein the original image is in color and occupies only a first portion of the display and the background is selected depending upon the colors in a second portion of the display outside the original image.

7. A method according to claim 1 wherein a first corner x1, y1 of the movable boundary is initially selected and a second diagonal corner x2, y2 of the movable boundary is sequentially designated by updating x2 and y2.

8. A method according to claim 7 wherein x1, y1 and x2, y2 are designated by moving a cursor on the display.

9. A method according to claim 8 wherein x1 and y1 are designated by depressing a pushbutton on a mouse and x2 and y2 are sequentially updated by moving the mouse with the pushbutton still depressed.

10. A method according to claim 1 wherein the excluded portion of the original image outside the original boundary is obscured only if a predetermined amount of time has elapsed after a most recent designation of the movable boundary.

11. A method for cropping a computer generated image on a raster display, comprising the steps of:

writing a digitized version of an original image into a first display buffer;

writing a digitized version of a background image into a second display buffer;

initially displaying the entire original image from the first display buffer on a display;

generating a cursor on the display;

determining whether the cursor is located anywhere on the original image;

if the cursor is located on the original image determining whether a first command has been executed to designate x1 and y1 as a first corner of a sequential set of rectangular cropped image boundaries;

moving the cursor over the original image while sequentially designating x2 and y2 as a second diagonal corner of the sequential set of rectangular cropped image boundaries;

monitoring a current pixel address of a raster beam of the display during its sweep and causing the pixel value to be selected from the first buffer if the address is within the boundaries defined by the current values of x1, y1, x2 and y2 and causing the pixel value to be selected from the second buffer if the address is outside the boundaries defined by the current values of x1, y1, x2 and y2;

determining whether a second command has been executed establishing final values for x2 and y2; and determining whether a third command has been executed indicating that the cropped image represented by the current values of x1, y1, x2 and y2 should be selected for further processing.

12. A method according to claim 11 and further comprising the steps of determining, after the execution of the second command, whether the cursor has been positioned over one of the corners of the current cropped image and permitting a new cropped image to be generated in accordance with an updating of any two values selected from the group consisting of x1, y1, x2 and y2.

13. An apparatus for interactively indicating image boundaries in digital image cropping, comprising:

first means for storing a digitized version of an original image;

second means for storing a digitized version of a predetermined background;

display means connected to the first and second storing means for selectively displaying portions of the original image surrounded by the predetermined background;

means connected to the display means for generating a cursor on the display means; and means for enabling a user to move the cursor on the display means to sequentially designate a set of movable boundaries on the originally image to generate a series of cropped images contained within the boundaries, each cropped image being surrounded by a complimentarily shape of the predetermined background.

14. An apparatus according to claim 13 wherein the enabling means includes a mouse with a pushbutton.

15. An apparatus according to claim 13 wherein the display means includes a raster beam that is moved over a predetermined sweep pattern.

16. An apparatus according to claim 15 wherein the storage means includes a first image buffer and a second image buffer.

17. An apparatus according to claim 16 wherein the enabling means includes a switch for selectively inputting a pixel value to the display means from the first image buffer or the second image storage buffer.

18. An apparatus according to claim 17 wherein the enabling means further includes means for calculating a current pixel address of the raster beam of the display means during its sweep pattern.

19. An apparatus according to claim 18 wherein the enabling means further includes buffer selector means for operating the switch depending upon whether the current pixel address of the raster beam is inside or outside of a current one of the set of boundaries.

20. An apparatus according to claim 13 wherein the display means and cursor generating means are provided by a personal computer.

21. An apparatus for interactively displaying a selected portion of an image on a display and cropping the remainder of the image, comprising:

a first display buffer to store the digitized version of the image;

a second display buffer to store a digitized version of a predetermined background pattern;

a display to receive an input and produce a visual image in accordance therewith, said display including a raster beam moved over pixels of the display in a predetermined sweep pattern;

a processor responsive to user input to designate an adjustable boundary on the original image;

a switch for selectively providing data from a selected one of the first or second display buffers to the input of the display; and a buffer selector to selectively provide data from a selected one of the first or second display buffers to the display's input depending upon whether a current pixel address of the raster beam is inside or outside of the adjustable boundary, thereby generating a series of cropped images within the boundary, with each potential cropped image being surrounded by a complimentarily shaped image of the predetermined background pattern.

* * * * *